(12) United States Patent
Suzuki et al.

(10) Patent No.: US 6,366,982 B1
(45) Date of Patent: Apr. 2, 2002

(54) RAID LIBRARY APPARATUS FOR TRANSPORTABLE MEDIA AND METHOD OF CONTROLLING THE LIBRARY APPARATUS

(75) Inventors: Hiroyuki Suzuki, Hadano; Mikio Sasaki, Odawara; Tadashi Matsumoto, Hadano, all of (JP)

(73) Assignee: Hitachi Electronics Engineering Co., Ltd. (JP)

( * ) Notice: Subject to any disclaimer, the term of this patent is extended or adjusted under 35 U.S.C. 154(b) by 0 days.

(21) Appl. No.: 09/419,190

(22) Filed: Oct. 15, 1999

(30) Foreign Application Priority Data

Oct. 23, 1998 (JP) .......................................... 10-302830

(51) Int. Cl.[7] .............................................. G05F 12/00
(52) U.S. Cl. ............................... 711/114; 369/30; 714/6
(58) Field of Search ...................... 711/114; 369/30–38; 714/6

(56) References Cited

U.S. PATENT DOCUMENTS

| | | | | |
|---|---|---|---|---|
| 5,537,566 A | * | 7/1996 | Konno et al. ................. | 711/114 |
| 5,588,012 A | * | 12/1996 | Oizumi ........................ | 714/805 |
| 5,724,321 A | * | 3/1998 | Vishlitzky .................... | 369/30 |
| 5,790,773 A | * | 8/1998 | DeKoning et al. ............. | 714/6 |
| 6,006,308 A | * | 12/1999 | Matsunami et al. ........... | 711/114 |

* cited by examiner

Primary Examiner—Do Hyun Yoo
Assistant Examiner—Nasser Moazzami
(74) Attorney, Agent, or Firm—Morrison & Foerster LLP

(57) ABSTRACT

In a media library apparatus, common addresses are imparted to storage shelves of a plurality of storage columns in corresponding relation to respective predetermined physical locations of the storage shelves in such a manner that each group of the storage shelves of the storage columns lying at a same physical location within the library apparatus is uniquely identifiable by a specific one of the common addresses. In a data striping process, a data read/write operation is performed on the media transported from a group of the storage shelves to which is imparted a specific one of the common addresses. Thus, a plurality of the media to be subjected to the data striping process can be managed collectively through designation of only one address. Namely, the media designation can be greatly simplified by just performing control such that the media stored in the same-address storage shelves of the individual storage columns are transported to the respective drive devices. There are also provided extra storage sections for storing abnormal and spare media. When an abnormal condition occurs in any one of the media during the data write operation, the abnormal medium is automatically replaced with the spare medium so as to carry on the data write operation using the spare medium in place of the abnormal condition. This arrangement achieves an enhanced operating efficiency of the media library apparatus.

9 Claims, 7 Drawing Sheets

RAID LIBRARY APPARATUS FOR TRANSPORTABLE MEDIA AND METHOD OF CONTROLLING THE LIBRARY APPARATUS

BACKGROUND OF THE INVENTION

The present invention relates generally to handling and management of RAID-organized recording media in library apparatus, and more particularly to a technique of simplifying and automatizing the handling and management of recording media as subjects of a data striping process.

Library apparatus for handling transportable recording media organized in RAID (acronym for "Redundant Array of Inexpensive Disks") arrays have been known, a typical example of which includes a holder/transporter for holding and transporting a designated recording medium such as an optical disk (hereinafter simply referred to as a "medium") to a designated place in the library apparatus, a plurality of storage columns having a multiplicity of storage shelves or cells for storing a multiplicity of media, and a plurality of drive devices for writing or reading data to or from a medium inserted therein. The library apparatus also includes a RAID controller for executing a so-called "data striping process" on the media inserted in the plurality of drive devices in a parallel or concurrent fashion. Such library apparatus for RAID-organized media are, so to speak, disk array apparatus where, for each of the storage columns, a designated medium is automatically transported via the holder/transporter between one of the storage shelves and the drive device and where the respective drive devices associated with the individual storage columns are operated in a parallel fashion to perform the data read/write operation on the media inserted therein while executing the data striping process on the inserted media. The above-mentioned RAID controller, which comprises a microcomputer containing a MPU, a ROM, a RAM, etc., controls the transportation of the media by the holder/transporter and also controls the parallel data read/write operations by the drive devices.

In the above-mentioned "data striping process", one complete data is broken down into a plurality of lower-order units called "stripe units" each having a predetermined data size such as a bit, byte or predetermined data block, and the thus-obtained stripe units are circulatively delivered to the individual drive devices so that the stripe units are written distributively across a plurality of the media inserted in the drive devices. The data striping process is also performed such that the stripe units are read out from the media, already having undergone the data write operation, so that the read-out stripe units read out from the individual media can be rebuilt together for use as one complete data. In both the data read operation and the data write operation during the data striping process, a plurality of the media to be processed concurrently are regarded as a single medium and therefore accessed simultaneously. By thus operating the plurality of drive devices in a parallel or concurrent fashion, the conventional library apparatus have been attempting to substantially increase a data transmission speed in accessing a large quantity of data. However, reliability of the library apparatus would unavoidably deteriorate as the number of the drive devices to be operated in parallel increases. Thus, more sophisticated disk array apparatus have been proposed, which are intended for achieving higher reliability by employing an information redundancy scheme; for example, duplicate copying of data in the case of RAID level 1, data redundancy by Hamming code in the case of RAID level 2, or data redundancy by parity in the case of RAID level 3. Such disk array apparatus are also called RAID (Redundant Array of Inexpensive Disks) library apparatus.

The known RAID library apparatus are arranged in such a manner that in case a trouble, i.e., an abnormal condition or anomaly such as a malfunction or complete failure, occurs in any one of the media on which the data read/write operation is being performed concurrently, the data and redundancy information are read out from all the other concurrently-processed media and a predetermined data recovery process is performed, on the basis of the read-out data and redundancy information, to recover the data of that medium having got into the abnormal condition.

Although DVDs (Digital Versatile Disks) have been getting more and more popular as high-density digital recording media in recent years, there has not yet been proposed an efficient RAID library apparatus for handling DVD media.

As stated above, the conventional RAID library apparatus perform the data striping process to break down one data into a plurality of stripe units for distributed storage across a plurality of media. Typically, the media to be simultaneously subjected to the data striping process are either randomly selected by a human operator outside the apparatus via a keyboard or other input device or automatically selected by a computer program or the like prestored in a ROM or RAM of the RAID controller. Various pieces of information pertaining to the media simultaneously subjected to the same data striping process, such as information as to in which of the storage shelves the media are being stored, are written into the RAM or the like. Specifically, in the conventional RAID library apparatus, each of the storage shelves has imparted thereto a different or unique physical address as information indicative of the location, in the library apparatus, of that storage shelf. As a consequence, the total amount of the media-pertaining information written in the RAM or the like tends to become enormous, which would significantly complicate management (i.e, address management) of the information pertaining to the media subjected to the data striping process.

Further, in the case where some abnormal condition (malfunctioning or complete failure) has occurred in one of the media during the data striping process, it has been conventional to replace the abnormal medium with a normal medium by manual labor. Also, in order to recover the data written on the abnormal medium, it is necessary to read out the data and redundancy information from one of the normal media having been subjected to the same data striping process as the abnormal medium. To this end, it has been customary to manually take out a necessary substitute medium from one of the storage shelves and insert the taken-out substitute medium into the associated drive device. However, because the information (address) of the storage shelf storing the substitute medium can be acquired only while the library apparatus is turned on or actually in operation, it was not possible to readily obtain such a substitute medium. As understood from the foregoing, the conventional RAID library apparatus achieve a very poor operating efficiency in that once an abnormal condition occurs in one of the media during the data striping process, a great amount of time must be consumed in recovering the data of the abnormal medium and no other processing is permitted until the necessary data recovery is completed. Besides, because the abnormal and normal media can not be distinguished from each other by their appearances, the manual replacement of the abnormal medium with the normal or substitute medium tends to be done erroneously.

SUMMARY OF THE INVENTION

It is therefore an object of the present invention to provide a RAID library apparatus and a method of controlling the RAID library apparatus which achieve a greatly enhanced operating efficiency by simplifying management of media and automatizing replacement of an abnormal medium with a normal medium.

It is another object of the present invention to provide a RAID library apparatus and a method of controlling the RAID library apparatus which allow an abnormal medium to be automatically replaced with a normal medium without a human intervention, to thereby avoid an erroneous interchange between the media.

In order to accomplish the above-mentioned objects, the present invention provides an improved media library apparatus which comprises: a transportation mechanism for transporting a transportable medium; a plurality of storage columns having a multiplicity of storage shelves for storing a multiplicity of media; a plurality of drive devices each provided for reading or writing desired data on a selected one of the media; a RAID (Redundant Array of Inexpensive Disks) controller for causing a plurality of the media that are to be subjected to a data striping process to be inserted in the plurality of drive devices and controlling operation of the plurality of drive devices, in a parallel fashion, so as to perform the data striping process on the media inserted in the drive devices; and a controller unit for imparting common addresses to the storage shelves of the plurality of storage columns in corresponding relation to respective predetermined physical locations, within the library apparatus, of the storage shelves in such a manner that each group of the storage shelves of the storage columns lying at a same physical location within the media library apparatus is uniquely identifiable by a particular one of the common addresses, and causing the data striping process to be concurrently performed, by the RAID controller, on the media stored in the storage shelves of the storage columns to which is imparted a specific one of the common addresses.

In the library apparatus arranged in the above-mentioned manner, the controller unit performs control such that the media stored in the storage shelves, to which is imparted a specific one of the common addresses, are subjected to a data striping process; that is, the transportation mechanism is controlled so that the media stored in the storage shelves of the individual storage columns lying at the same physical location are transported thereby to the associated drive devices. If the second address is designated, then the media stored in the second storage shelves from the top of the individual storage columns are taken out and transported to the respective drive devices for the data striping process thereby. Upon completion of the data read/write operation, all the media are transported from the drive devices back to their original storage shelves (i.e., in this case, the second storage shelves from the top of the individual storage columns) for re-storage therein. Because the media stored in the shelves of the individual storage columns, to which the same address is imparted, are subjected to the data striping process, the media designation for the data striping process can be greatly simplified. Namely, according to the present invention, all the media to be subjected to the data striping process can be designated collectively by designation of just one and the same address, without having to designate a different address for each of the storage columns as in the past. By thus grouping the storage shelves of the individual storage columns by use of the common addresses, all the shelves in the library apparatus can be managed with a reduced number of the addresses, and the media having been subjected to the data striping process can be managed in a collective and much simplified fashion.

Further, in recovering the data of the abnormal medium (e.g., malfunctioning or failed medium), it is possible to readily locate another medium on which desired data has been written during the same data striping process as the abnormal medium and which is a non-defective or normal medium corresponding to the abnormal medium. Namely, with the inventive feature that all the media having been subjected to the same data striping process are always stored in the same-address storage shelves of the individual storage columns, so that the user can readily identify the individual media physically and thus readily take out the medium necessary for recovering the data of the abnormal medium.

The present invention also provides a media library apparatus which comprises: a transportation mechanism for transporting a transportable medium; a main storage section for storing a multiplicity of media; a plurality of drive devices each provided for reading or writing desired data on a selected one of the media; a RAID controller for causing a plurality of the media that are to be subjected to a data striping process to be inserted in the plurality of drive devices and controlling operation of the plurality of drive devices, in a parallel fashion, so as to perform the data striping process on the media inserted in the drive devices; a spare medium storage section for storing a spare medium; and a controller unit for, when any one of the media that are being subjected to the data striping process has an abnormal condition, causing the desired data to be written on the spare medium in place of the medium having the abnormal condition.

In case any one of the media that are being subjected to the data striping process is determined as having an abnormal condition, the media library apparatus thus arranged allows the desired data to be written on the spare medium in place of the abnormal medium. Further, the data of the abnormal medium can be written onto the spare medium. Even in the data read operation, if any one medium is determined as having an abnormal condition, the data can be recovered and written onto the spare medium. Namely, once there occurs an abnormal condition in one of the media during the data write operation, the present invention performs the necessary data recovery by assigning a new or spare medium, and thus allows the library apparatus to be used for any other processing immediately after occurrence of the abnormal condition. This means that the data read/write operation can be safely carried on (i.e., the data read/write operation can be automatically adjusted to continue) in spite of the occurrence of the abnormal condition and therefore the library apparatus can be utilized with an increased operating efficiency.

The present invention further provides a media library apparatus which comprises: a transportation mechanism for transporting a transportable medium; a main storage section for storing a multiplicity of media; a plurality of drive devices each provided for reading or writing desired data on a selected one of the media; a RAID controller for causing a plurality of the media that are to be subjected to a data striping process to be inserted in the plurality of drive devices and controlling operation of the plurality of drive devices, in a parallel fashion, so as to perform the data striping process on the media inserted in the drive devices; a spare medium storage section for storing a spare medium; an abnormal medium storage section for storing a medium having an abnormal condition; and a controller unit for, when any one of the media that are being subjected to the data striping process has an abnormal condition, causing the medium having the abnormal condition to be moved over to the abnormal medium storage section to automatically replace the medium having the abnormal condition with the spare medium and carrying on the data striping process using the spare medium.

In the media library apparatus thus arranged, spare and abnormal media are stored in the spare and abnormal medium storage sections, respectively. When there occurs an abnormal condition in any one of the media during the data striping process (data read/write operation), the medium having the abnormal condition is automatically replaced with the spare medium and recovered data is written onto the spare medium having replaced the abnormal medium. With this feature, the media which are the subjects of the data striping process can be effectively managed using the same physical location (address) shared among the storage columns; that is, the management of the media throughout the library apparatus can be greatly simplified according to the present invention.

The media library apparatus of the present invention may further comprise a medium introducing(loading)/discharging (unloading) storage section removably attached to the media library apparatus. In this case, the medium having the abnormal condition is moved out of either the main storage section or the abnormal medium storage section to be then temporarily stored in the medium introducing/discharging storage section so that the medium having the abnormal condition can be discharged out of the media library apparatus via the medium introducing/discharging storage section. Then, a spare medium is inserted into the medium introducing/discharging storage section in order to replenish the media library apparatus with the spare medium and is then moved out of the medium introducing/discharging storage section to be stored in the spare medium storage section.

As noted above, once there occurs an abnormal condition in any one of the media during the data striping process, the present invention automatically replaces the abnormal medium with the spare medium and causes the abnormal medium to be stored into the abnormal medium storage section. Because the automatic medium replacement is no longer permitted if all the spare media are used up, one or more spare media must be stored in the spare medium storage section at any given time. This is the reason why the present invention is arranged to insert a spare medium into the medium introducing/discharging storage section in order to replenish the media library apparatus with the spare medium and also discharge the abnormal condition can be discharged out of the media library apparatus via the medium introducing/discharging storage section. Namely, according to the present invention, the discharge of the abnormal medium discharge and the replenishment of the apparatus with the new normal or spare medium can be conducted collectively without a human intervention, and therefore it is possible to reliably prevent an erroneous interchange between the abnormal medium and normal medium.

According to the present invention, each of the above-mentioned transportable media may be transferred to and from the transportation mechanism and transported by its holder/transporter while being supported on a separate carrying support such as a tray; thus, the present invention can be constructed as a DVD (Digital Versatile Disk) library apparatus. Specifically, in most cases, tray-like carrying supports are provided for disk-shaped media, such as DVDs and CDs (Compact Disks), in a one-to-one relation (i.e., one carrying support per disk), and these disk-shaped media are each stored and, whenever necessary, transported together with the carrying support. Note that the carrying supports may be in the form of cartridges or the like other than the trays.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 1:
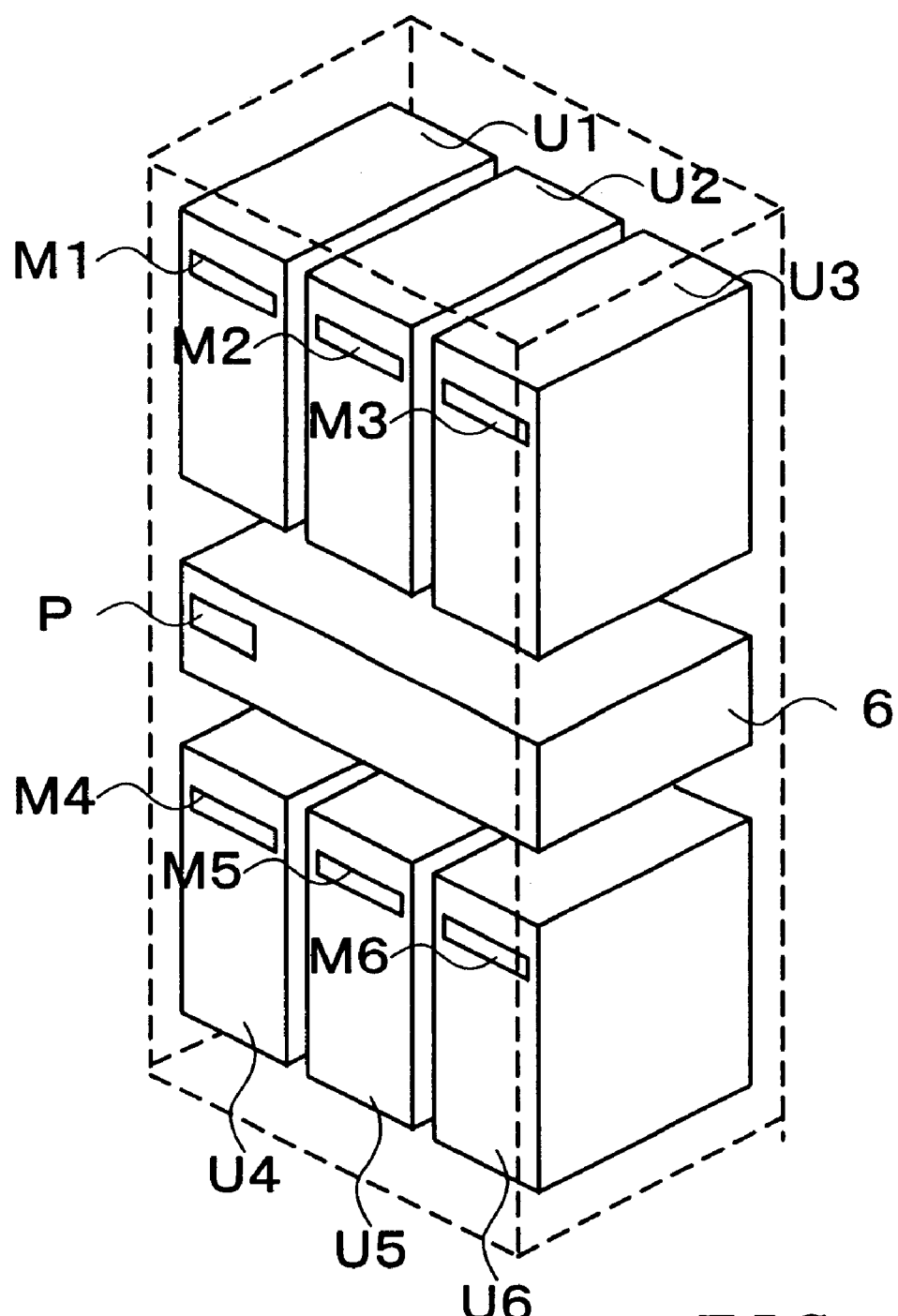
FIG. 1 is a perspective view showing a general construction of a RAID library apparatus in accordance with a preferred embodiment of the present invention.
Figure 2:
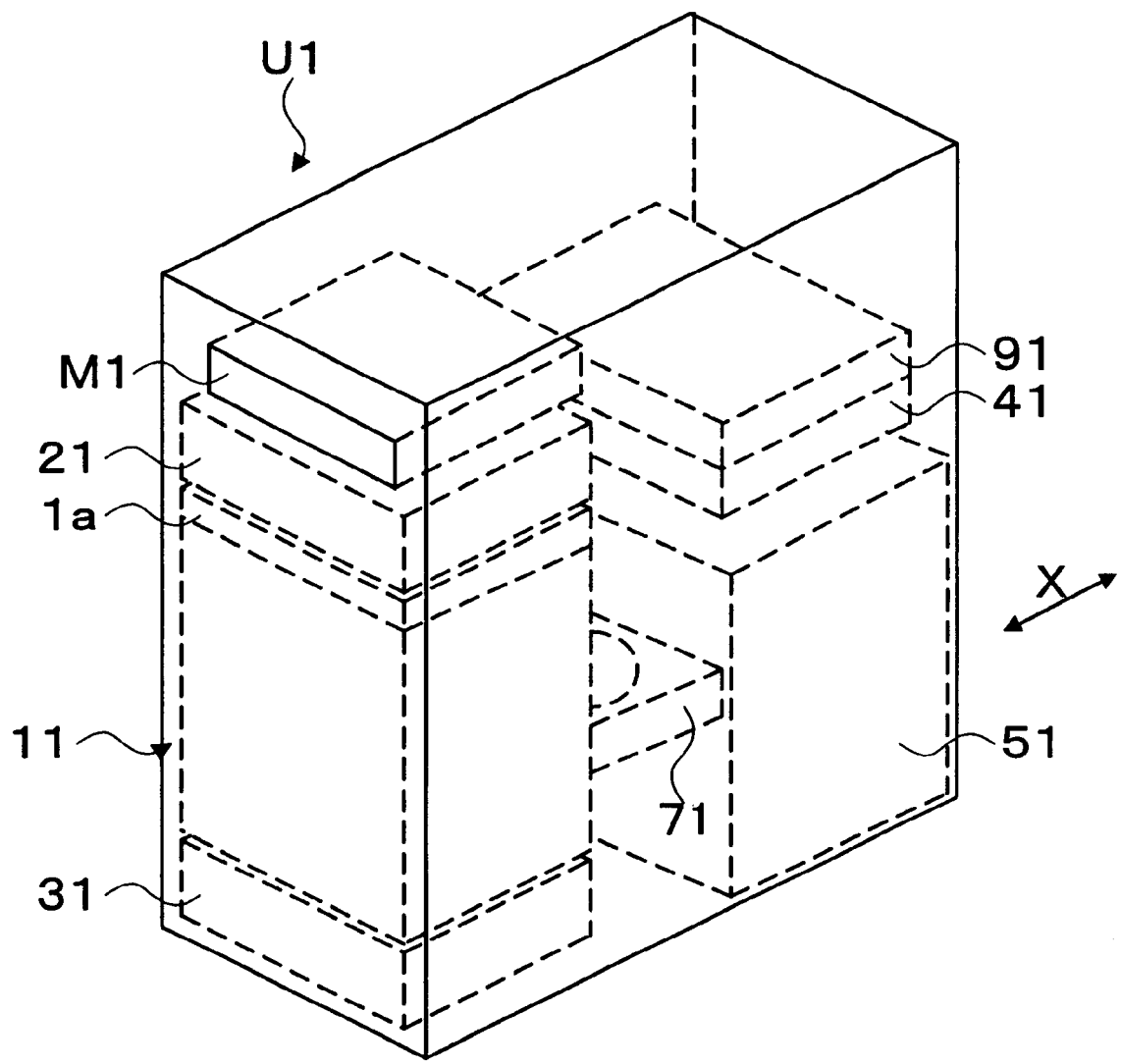
FIG. 2 is an enlarged perspective view showing an exemplary general construction of one of a plurality of library units shown in FIG. 1.

FIG. 1 is a perspective view showing a general construction of a RAID library apparatus for handling DVDs in accordance with a preferred embodiment of the present invention. FIG. 2 is an enlarged perspective view showing a general construction of one of a plurality of library units U1 to U6 shown in FIG. 1; note that only the library unit U1 is shown in FIG. 2 because the other library units U2 to U6 are each identical in construction to the library unit U1. Each of the library units U1 to U6 includes a holder/transporter 71 for holding and transporting a designated DVD medium to a designated place in the library unit, a main storage column 11 having a multiplicity of storage shelves 1a for storing a multiplicity of media (only one shown for simplification of the illustration), and at least one drive device 41 for writing or reading data to or from a medium.

In response to data read/write control instructions (e.g., in the form of electric signals) given to a RAID controller 6 via a control panel P or not-shown higher-order processor (e.g., personal computer), the RAID library apparatus simultaneously activates the six library units U1 to U6 so as to simultaneously carry out the data read/write operation on media inserted in the respective drive devices 41 while performing a conventional data striping process on the inserted media. More specifically, each of the library units U1 to U6 has a control section 91, which, on the basis of control instructions from the RAID controller 6, takes out a designated medium from a predetermined one of the storage shelves 1a in the main storage column 11. Then, the control section 91 controls the holder/transporter 71 to transport the taken-out designated medium to the drive device 41 and, after the necessary transportation, controls the drive device 41 to carry out the data read/write operation on the medium. Namely, each of the library units U1 to U6 is constructed to perform the data read/write operation on each designated medium independently of the other library units. Further, each of the library units U1 to U6 has a mass entry port M1–M6 to allow a desired medium to get into or out of the library unit.

Although the library apparatus according to the preferred embodiment is shown and described as including a total of six library units U1 to U6, it may include any other plurality of library units than six. Further, although the library apparatus according to the preferred embodiment is shown and described as including the holder/transporter 71 for each of the library units, only one holder/transporter 71 may be provided in the entire library apparatus for shared use among the library units.

Each of the library units includes a spare medium storage section 21 where a plurality of spare media can be prestored. Thus, in a situation where some abnormal condition or anomaly has occurred in any one of the media during the data read/write operation, the medium having the abnormal condition, i.e., the abnormal medium, can be quickly replaced with one of the media prestored in the spare medium storage section 21. Abnormal medium storage section 31 is provided for storing the abnormal medium thus replaced by the spare or substitute medium. Namely, only spare media are stored in the spare medium storage section 21, and only the abnormal media are stored in the abnormal medium storage section 31.

Each of the library units U1 to U6 also includes a medium introducing (i.e., loading)/discharging (i.e., unloading) storage section 51, which can be attached and detached to and from the library apparatus by being pushed and pulled, in a direction of arrow X, relative to the library apparatus along guide rails secured to the inner surfaces of opposed side walls or a bottom wall of the library unit in question. This medium introducing/discharging storage section 51 can be used to exchange media between the outside and inside of the library apparatus, as necessary. Namely, by exchanging media between the spare medium storage section 21 and abnormal medium storage section 31 and the medium introducing/discharging storage section 51, additional spare media can be added, from outside the library apparatus, to the spare medium storage section 21 and abnormal media can be discharged, from the abnormal medium storage section 31, to outside the library apparatus.

Although the embodiment has been shown and described above as including the spare medium storage section 21 and the abnormal medium storage section 31 provided separately from each other, the present invention is not necessarily so limited. For example, the spare medium storage section 21 and the abnormal medium storage section 31 may be combined into one common storage section, in which case, however, spare media can not be prestored in every part of the one common storage section, leaving no more available storage space therein; that is, in this case, the interchange between a spare medium and an abnormal medium is effected only by first placing the abnormal medium from its storage shelf 1a to the common storage section and then newly loading the spare medium into the storage shelf 1a. Therefore, if spare media have been prestored in every part of the one common section, then no abnormal medium can not be moved from the shelf 1a into the common storage section. Further, because the holder/transporter 71, which is responsible for transporting both an abnormal medium and a spare medium, is holding, i.e., occupied by, an abnormal medium, the holder/transporter 71 is unable to take out a spare medium from the common section and transport it to a designated place, so that the necessary interchange between abnormal and spare media is permitted in this situation.

However, in the case where each of the library units U1 to U6 is provided with a plurality of the holder/transporters 71, the above-mentioned inconveniences would be avoided, because a spare medium can be taken out and transported to a designated place unless at least one of the holder/transporters 71 is holding a medium; that is, in such a case, the media interchange can be made even when spare media have been prestored in every part of the one common storage section.

Figure 3:
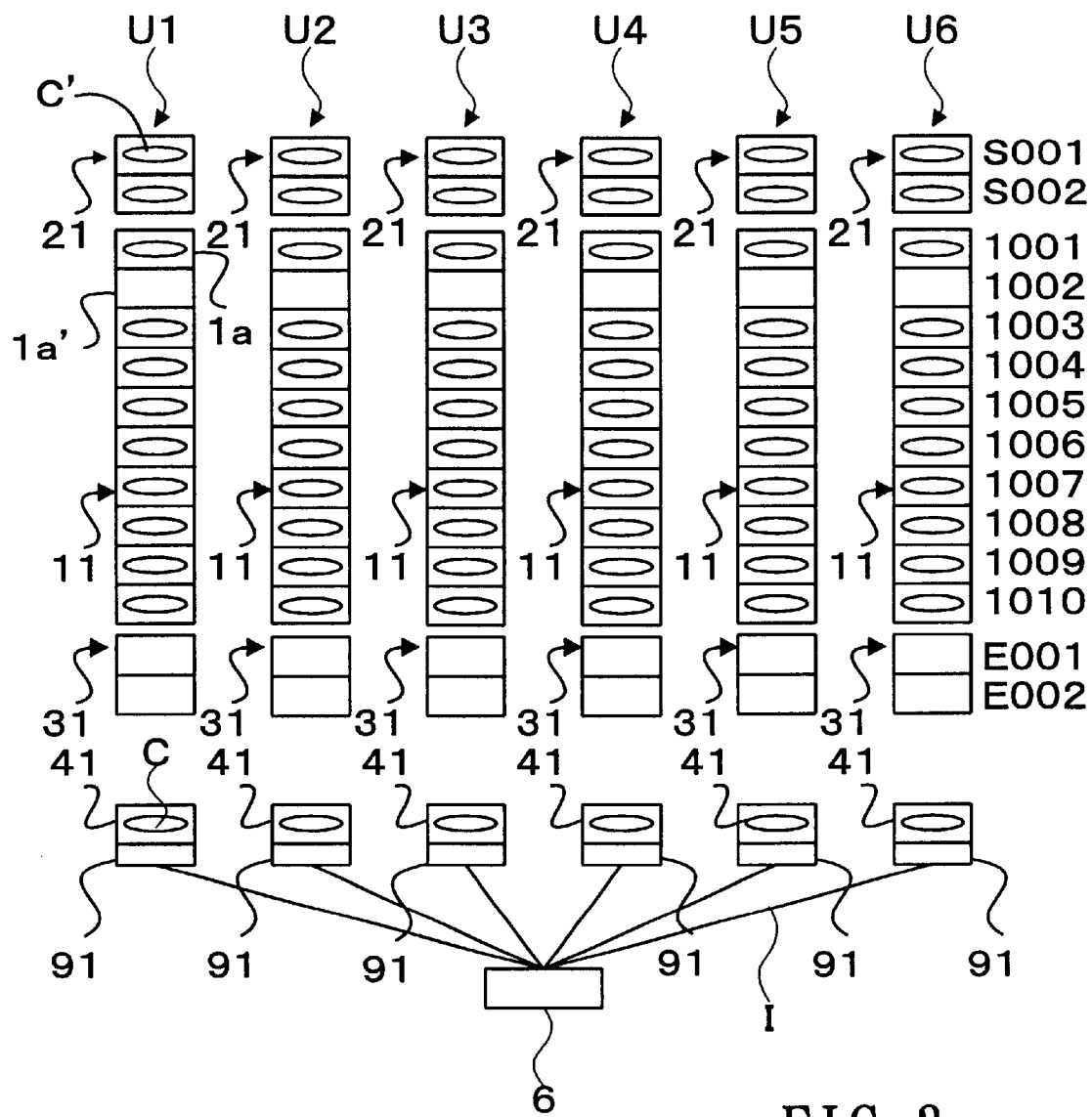
FIG. 3 is a schematic front elevational view showing an exemplary general arrangement of the RAID library apparatus of FIG. 1.

Further, FIG. 3 is a schematic front elevational view showing an exemplary general arrangement of the RAID library apparatus for DVDs embodying the present invention. For ease of understanding, all of the library units U1 to U6 are shown as placed side by side, and illustration of the holder/transporters 71 is omitted here. Further, in the following description, the term "medium" may be construed not only as the medium itself but also as a combination of the medium and a tray supporting the medium thereon.

The number of the storage shelves in the main storage column 11 is the same among the library units U1 to U6, the number of the storage shelves in the spare medium storage section 21 is the same among the library units U1 to U6, and so is the number of the storage shelves in the abnormal medium storage section 31. As further shown in FIG. 3, common physical addresses are imparted to the corresponding storage shelves of the library units U1 to U6 in such a way that each group (in the illustrated example, a same horizontal row) of the storage shelves in the library units U1 to U6, lying at a same physical location within the library apparatus, is uniquely identified by a specific one of the common physical addresses. More specifically, as indicated to the right of the library unit U6 in FIG. 3, physical addresses "S001" and "S002", "1001" to "1010" and "E001" and "E002" are imparted, sequentially in a top-to-bottom direction of the figure, to the storage shelves of the spare medium storage section 21, main storage column 11 and abnormal medium storage section 31, respectively, in each of the library units U1 to U6. Whereas the spare medium storage section 21, main storage column 11 and abnormal medium storage section 31 in each of the library units U1 to U6 are illustrated as provided separately from each other, the spare medium storage section 21 and abnormal medium storage section 31 may be provided integrally with the main storage column 11 although not specifically shown. Namely, in each of the library units U1 to U6, the storage shelves located over a predetermined range of the main storage column 11 may be assigned as the spare medium storage section 21 and abnormal medium storage section 31; for example, the storage shelves at addresses "1001" and "1002" may be assigned as the spare medium storage section 21 while the storage shelves at addresses "1009" and "10010" may be assigned as the abnormal medium storage section 31.

The control sections 91 of the individual library units U1 to U6 are electrically connected to the RAID controller 6 via respective input/output interfaces I such as SCSIs (Small Computer System Interfaces) so that various electric signals, such as those representing control instructions, are communicated between the individual control sections 91 and the RAID controller 6.

As set forth above, in response to predetermined control instructions given from the not-shown higher-order processor or the like, the RAID controller 6 of the library apparatus carries out the data read/write operation while performing the data striping process. In the preferred embodiment, the control instructions contain designation of media to be concurrently subjected to data striping process; specifically, the designation is made using the address imparted to a predetermined group of the storage shelves in the individual main storage columns 11, e.g., address "1002" designating the respective second-from-top storage shelves 1a' of the individual main columns 11. If address "1002" is designated like this, the RAID controller 6 transmits the designated address "1002" to the respective control sections 91 of the individual library units U1 to U6. Each of the control sections 91, having received the designated address, takes out the medium from the storage shelf 1a', corresponding to the e designated address "1002", in the library unit and causes the taken-out medium to be transported to the associated drive device 41 by means of the holder/transporter 71. Then, upon completion of the transportation of the designated media from the group of the storage shelves, identified by the same address, in all the library units U1 to U6, the drive devices 41 in these library units U1 to U6 are activated concurrently to execute the data read/write operation on the media inserted therein. In the above-described manner, the media C stored in the storage shelves 1a' (namely, the storage shelves corresponding in physical location to each other, i.e., the same group (in the illustrated example, the same row) of the storage shelves identified by the common physical address) of the respective main storage columns 11 are used as subjects of the data read/write operation.

Now, a detailed description will be made about the data read/write operation in the preferred embodiment, with reference to several flow charts.

Figure 4:
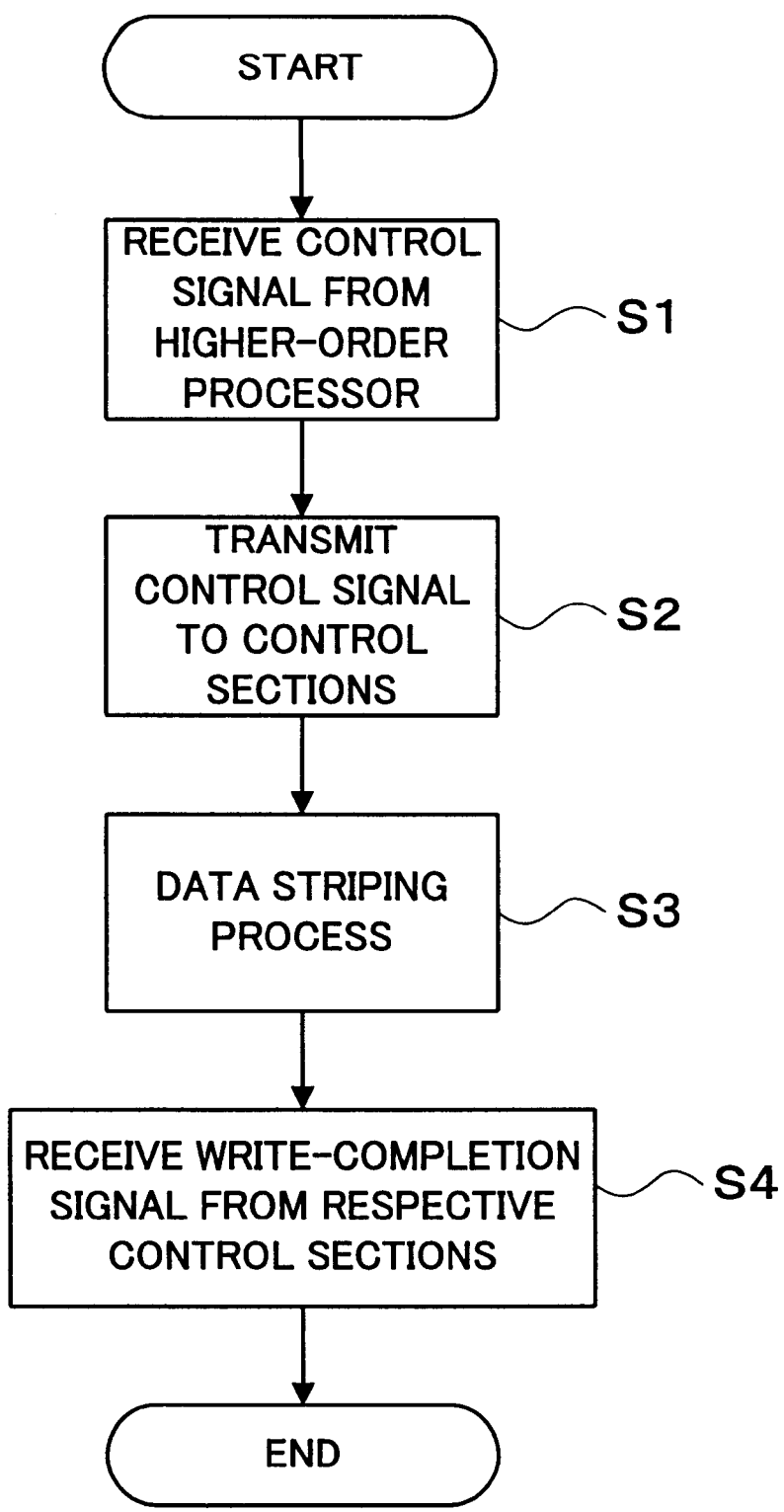
FIG. 4 is a flow chart of an operational sequence executed by a RAID controller of FIG. 6 during a data read/write operation in the preferred embodiment.

FIG. 4 is a flow chart of an exemplary operational sequence executed by the RAID controller 6 during the data read/write operation in the embodiment. For purposes of simplification, the operational sequence will now be described only about the data write operation.

At first step S1, the RAID controller 6 receives, from the higher-order processor, data write instructions along with an instruction designating media to be subjected to the data write operation. After reception of these instructions, the RAID controller 6 simultaneously transmits the media designating instruction to the respective control sections 91 of the individual library units U1 to U6, at step S2. Then, at next step S3, each of the control sections 91 in the library units U1 to U6 is caused to write predetermined data based on the data striping process as will be later described in detail in relation to FIG. 5. Then, once the RAID controller 6 is informed by all the control sections 91, via write-completion signals from the control sections 91, that the predetermined data writing has been completed, it terminates the current data write operation at step S4.

As noted earlier, the designation of the media is made using the common address previously imparted to a particular group of the storage shelves, lying at the same physical location or row, in the library units U1 to U6, e.g., address "1002" for the second-from-top storage shelves 1a' in the individual library units U1 to U6. Namely, by thus imparting a common address to the corresponding storage shelves (i.e., the storage shelves lying at the same row) of the library units U1 to U6, all the six storage shelves located at the same row in the individual library units U1 to U6 can be designated collectively by designation of one and the same address, rather than by six different addresses being designated one by one. However, it should be noted that the RAID controller 6 transmits only one designated address separately to the respective control sections 91 of the library units U1 to U6 at step S2.

Figure 5:
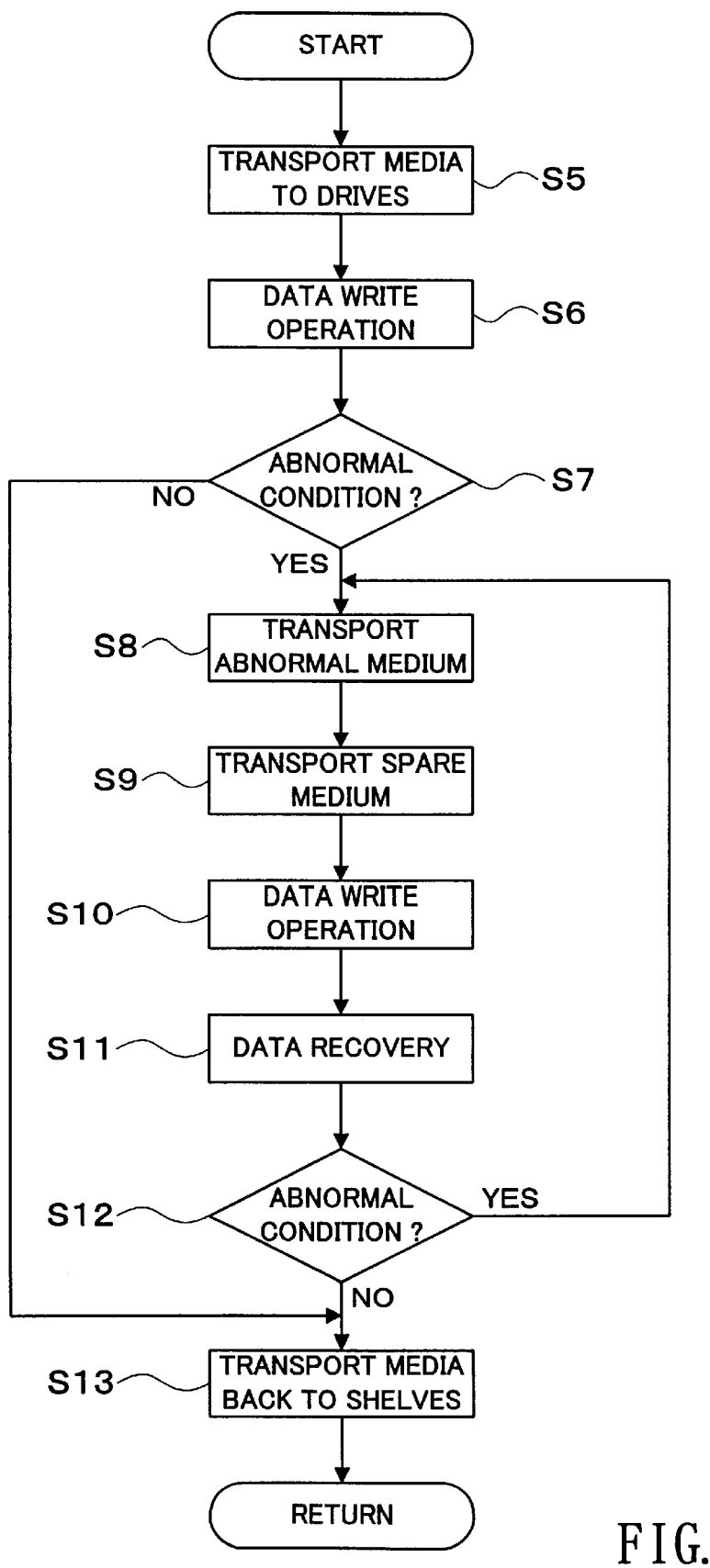
FIG. 5 is a flow chart of an operational sequence of a medium replacement process executed by each of control sections of the library units during a data striping process.

FIG. 5 is a flow chart of an operational sequence executed by each of the control sections 91 of the library units U1 to U6 during the data striping process at step S3 of FIG. 4. Although the operational sequence is executed in parallel by the respective control sections 91 of the library units U1 to U6, only the operational sequence executed in the control section 91 of the library unit U1 is described below with reference to FIG. 5, for simplicity of description.

At first step S5 of FIG. 5, the control section 91 controls the holder/transporter 71 to vertically move to the storage shelf 1a' at the designated address "1002" of the main storage column 11 in order to take out the medium C from the storage shelf 1a and then transport the taken-out medium C to the drive device 41. After the medium C is completely inserted in the drive device 41, the control section 91 writes data onto the medium C by means of the drive device 41, at step S6. In this data write operation, data broken down into predetermined stripe units (i.e., having undergone the data striping process) are written onto the medium C. Then, at step S7, it is determined whether or not any abnormal condition, such as a malfunction or complete failure, has occurred in the medium C on which the data are being written. If such an abnormal condition has occurred as determined at step S7 (YES determination), the defective or abnormal medium C is replaced with a spare medium C' previously stored in the spare medium storage section 21 so that the data write operation is then performed on the spare medium C' as will be described later in relation to steps S8 to S10. If no abnormal condition has occurred as determined at step S7 (NO determination), there is no need for the media replacement, data recovery etc. and thus the data write operation continues to be performed on the initially-inserted medium C. Upon completion of the data write operation, the medium C is transported back to the storage shelf 1a' for re-storage therein, at step S13.

At step S8, the holder/transporter 71 withdraws the defective or abnormal medium C from the drive device 41 and carries it to the abnormal medium storage section 31. After that, at step S9, the holder/transporter 71 moves to the spare medium storage section 21, from which the holder/transporter 71 takes out a spare medium C' and transports the spare medium C' to the drive device 41 for insertion therein. Thus, the data write operation is carried on with the spare medium C' at step S10; in this case, the data write operation is restarted with data immediately following the data written just before identification of the abnormal condition in the initial medium C. After completion of the data writing at step s10, a data recovery process is performed by reading out the corresponding data from one of the other media, excluding the spare medium C', having undergone the same data write operation in the other library units U2 to U6 and writing the thus-read-out data onto the spare medium C', at step S11. If an abnormal condition again occurs in the spare medium C' during the data write operation of step S10 or S11 as determined at step S12, then the above-described operations of steps S8 to S11 are repeated. Once the data write operation is completed in the above-described manner, the holder/transporter 71 takes out the spare medium C' from the drive device 41 and transports the medium C' to the storage shelf 1a' of the main storage column 11 in which the abnormal medium C was initially stored and causes the medium C' to be stored into the storage shelf 1a', at step S13.

If, during the data writing based on the data striping process, an abnormal condition occurs in any one of the media being driven by the drive devices 41 of the individual library units U1 to U6, the defective or abnormal medium C is automatically replaced with a spare medium C', i.e., the spare medium C' is inserted in the drive device 41 in place of the abnormal medium C, at steps S8 and S9. Then, the data write operation is carried on with the spare medium C' as a normal medium. Namely, the remaining (not-yet-written) data are written onto the newly-inserted spare medium C' at step S10 without interrupting the data write operation, so that the quantity of data to be recovered in the later-described data recovery process can be reduced to a considerable degree. Because the abnormal condition occurring in any of the media during the data read/write operation can thus be automatically repaired after completion of the data read/write operation, it is possible to eliminate the need for effecting a separate data recovery process on the data written on the abnormal medium C.

Whereas the embodiment has been described as actually replacing the abnormal medium C with the spare medium C' (steps S8 and S9), only a change may be made between the address of the abnormal medium C and the address of the spare medium C' without the actual replacement of the abnormal medium C itself. Namely, in the above-described example, only address "1002" of the storage shelf that was storing the abnormal medium C and address "S001" of the shelf storing the spare medium C' (see FIG. 3) may be interchanged; thus, in response to subsequent designation of address "1002", the spare medium C' stored in the spare medium storage section 21 of the library unit in question will be treated as a normal medium corresponding to the abnormal medium C.

The addresses of all the storage shelves may be retained either in the RAID controller 6 or in the control section 91 of each of the library units U1 to U6. Further, the RAID controller 6 or each of the control sections 91 may retain two sets of the same addresses in a memory such as a RAM.

The following paragraphs describe a media replacement process using the medium introducing/discharging storage section 51 in each of the library units U1 to U6.

Figure 6:
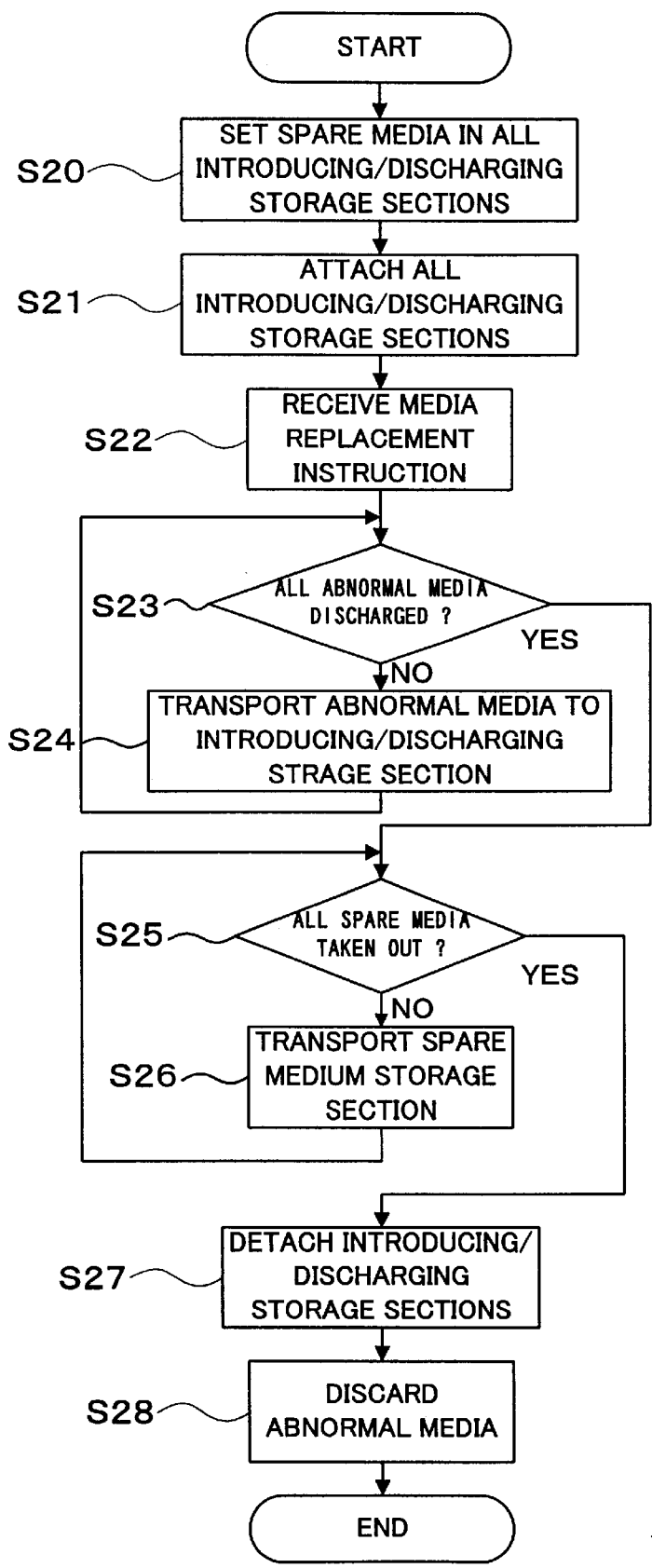
FIG. 6 is a flow chart of a media replacement process performed in an example where a medium introducing/discharging storage section has a spare medium storage location and an abnormal medium storage location provided separately from each other.

FIG. 6 is a flow chart of a media replacement process performed in the preferred embodiment for introducing or loading a new spare medium into the library unit and discharging or unloading a defective or abnormal medium from the library apparatus. This media replacement process is executed using the medium introducing/discharging storage section 51, in response to a media replacement instruction from the higher-order processor. The following description will be made in relation to a case where a spare medium storage location and an abnormal medium storage location are provided in the medium introducing/discharging storage section 51 of each of the library units U1 to U6 and the media replacement process is performed collectively in the library units U1 to U6.

At first step S20 of FIG. 6, a spare medium is set or stored in advance in the spare medium storage location of the medium introducing/discharging storage section 51 in each of the library units U1 to U6. After that, all the medium introducing/discharging storage section 51 now having the spare media stored therein are installed in respective predetermined positions of the library apparatus, at step S21. After the installation of all these medium introducing/discharging storage sections 51, an instruction to execute the media replacement process is received from the higher-order processor, operation panel or the like, at step S22. In response to the media replacement instruction, the control section 91 in each of the library units U1 to U6 controls the associated holder/transporter 71 to take out any abnormal media from the abnormal medium storage section 21 and then place them in the abnormal medium storage location of the medium introducing/discharging storage section 51 of that library unit, at steps S23 and S24. After every abnormal medium has been discharged through the medium introducing/discharging storage section 51 (i.e., YES determination at step S23), the control section 91 in each of the library units U1 to U6 takes out any spare media from the associated medium introducing/discharging storage section 51 and place them in the spare medium storage section 31, at steps S25 and S26. After all the spare media have been thus stored, the medium introducing/discharging storage sections 51 for the library units U1 to U6 are detached from the library apparatus at step S27. Then, the abnormal media are manually removed (discarded) from the medium introducing/discharging storage sections 51 at step S28.

As noted above, the preferred embodiment is arranged in such a manner that when an abnormal condition occurs in any of the media being subjected to the data read/write operation, the abnormal medium is automatically replaced with a spare medium; for that purpose, spare media must of course have been stored in advance in the spare medium storage sections 21 of the individual library units U1 to U6. Further, because there is a limit to the number of media capable of being stored in the abnormal medium storage sections 31 of the library units U1 to U6, it is necessary for the abnormal media to be discharged out of the library apparatus at predetermined timing. Thus, spare media are prestored in the medium introducing/discharging storage sections 51 so that any abnormal medium identified during the data read/write operation is automatically replaced with the spare medium from the medium introducing/discharging storage section 51 and then the identified abnormal medium is discharged via the medium introducing/discharging storage section 51 from the library apparatus. By thus providing the medium introducing/discharging storage sections 51 in corresponding relation to the library units U1 to U6 and also providing the spare medium storage location and abnormal medium storage location separately in each of the medium introducing/discharging storage sections 51, the media replacement process can be carried out collectively or in a parallel fashion in these library units U1 to U6.

Although the preferred embodiment has been described as including the spare medium storage location and abnormal medium storage location in each of the medium introducing/discharging storage sections 51, the media replacement process can be carried out appropriately even where the spare medium storage location and abnormal medium storage location are not included in each of the medium introducing/discharging storage sections 51, by just modifying the operational sequence of the media replacement process of FIG. 6 as will be described below.

Figure 7:
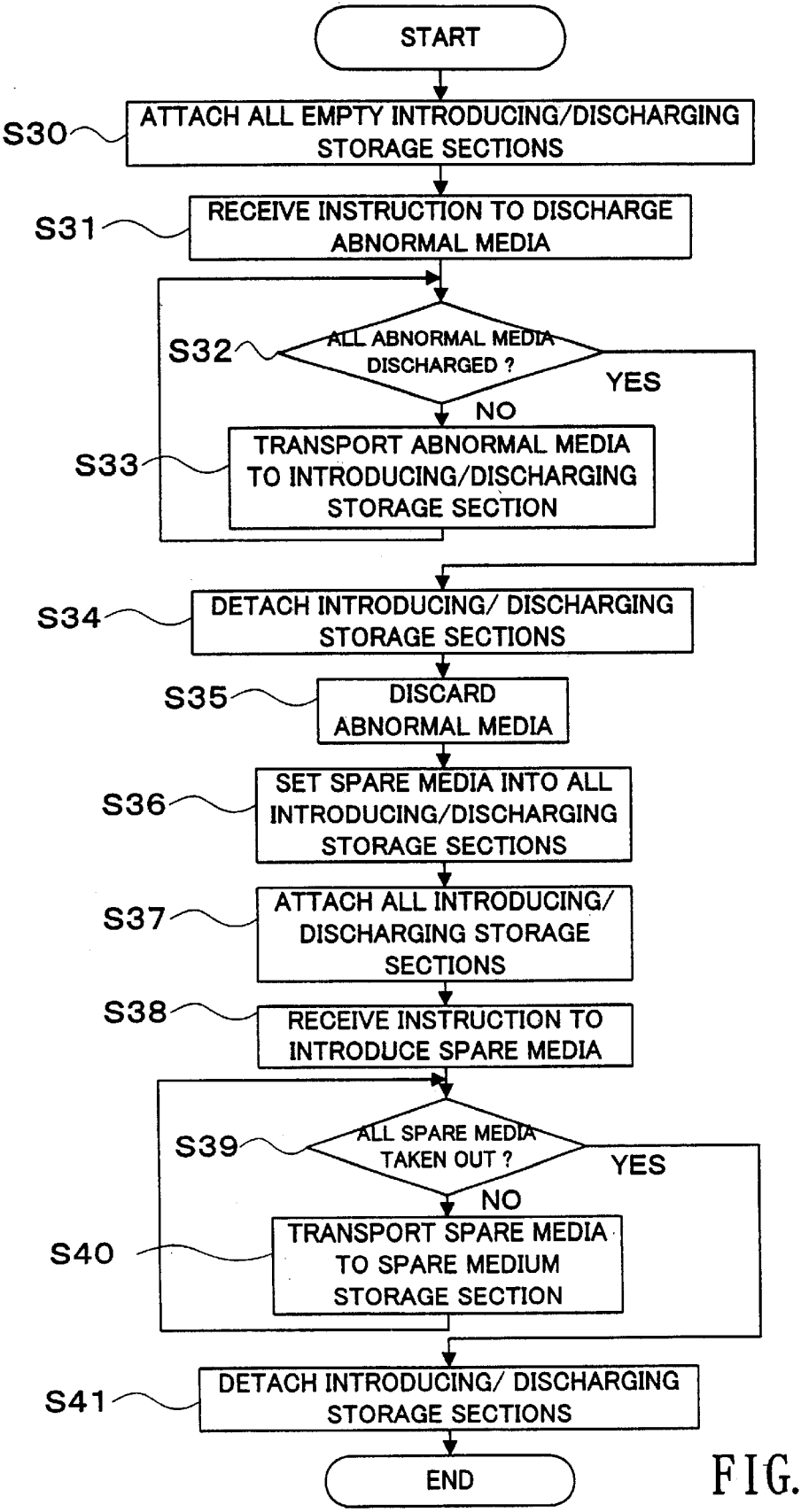
FIG. 7 is a flow chart showing a modified operational sequence of the media replacement process performed in another example where the medium introducing/discharging storage section does not have the spare medium and abnormal medium storage locations provided separately from each other.

FIG. 7 is a flow chart showing a modified operational sequence of the media replacement process. At first step S30 of FIG. 7, six empty medium introducing/discharging storage sections 51 (with no media previously stored in their spare medium storage locations) are set in the respective predetermined positions of the library apparatus. Then, once an instruction to discharge abnormal media from the library apparatus is received from the higher-order processor, operation panel or the like at step S31, the control section 91 in each of the library units U1 to U6 controls the associated holder/transporter 71 to take out any abnormal media from the abnormal medium storage section 21 and place them in the medium introducing/discharging storage section 51 of that library unit, at steps S32 and S33. If it is determined at step S33 that all the abnormal media have been stored in the respective medium introducing/discharging storage sections 51 (YES determination at step S33), then all the medium introducing/discharging storage sections 51 are detached from the library apparatus at step S34 and the abnormal media are manually removed (discarded) from the medium introducing/discharging storage sections 51 at step S35. After that, at step S36, spare media are manually set or stored into the spare medium storage locations of all the medium introducing/discharging storage sections 51. Then, all of the six medium introducing/discharging storage sections 51 with the spare media previously stored therein are set in the predetermined positions of the library apparatus, at step S37. Then, once an instruction to load introduce or load spare media into the library apparatus is received from the higher-order processor, operation panel or the like at step S38, the control section 91 in each of the library units U1 to U6 controls the associated holder/transporter 71 to take out the spare media from the associated medium introducing/discharging storage section 51 and place them in the spare medium storage section 31, at steps S39 and S40. After all the spare media have been placed from the medium introducing/discharging storage sections 51 into the spare medium storage sections 31 (YES determination at step S39), all the medium introducing/discharging storage sections 51 are detached from the library apparatus at step S41.

Unlike the media replacement process of FIG. 6, the modified media replacement process of FIG. 7 is carried out in such a situation where each of the medium introducing/discharging storage sections 51 includes no separate spare medium storage location and abnormal medium storage location. For this reason, the spare media replenishment can not be conducted until every abnormal medium has been discharged out of the library apparatus through the medium introducing/discharging storage section 51. By dividing the media replacement process into the operation of discharging the abnormal media and the operation of replenishing the library apparatus with the spare media and carrying out these two operations separately on two successive occasions as noted above, the modification of FIG. 7 can perform the media replacement process in generally the same manner as in the case where each of the medium introducing/discharging storage sections 51 includes the media storage location and abnormal medium storage location separately from each other.

It should also be understood that the above-mentioned medium introducing/discharging storage section 51 need not necessarily be provided for each of the library units U1 to U6; instead, the entire library apparatus may be provided with only one such a medium introducing/discharging storage section 51. In such a case, the media replacement can be done in all the library units U1 to U6 by repeating the above-mentioned operations successively six times, i.e., a plurality of times corresponding to the total number of the library units contained in the library apparatus; namely, the media replacement process, in this case, is performed separately per library unit, rather than concurrently or in parallel in all the library units.

In summary, the RAID library apparatus in accordance with the present invention is characterized in that a plurality of media to be subjected to (i.e., to be subjects for) a same data striping process are always stored in a group of storage shelves located at a same physical position (i.e., identifiable by a common address) in the individual storage columns and transported therefrom to the associated drive devices. By managing the media to be subjected to the same data striping process collectively using the common address, the present invention can greatly simplify the management of the media and also provide for physical management of the media. Further, because the replacement of an abnormal medium with a non-defective or normal spare medium can be conducted automatically to thereby permit automatic management of the data read/write operation including the data recovery, the RAID library apparatus of the invention achieves an greatly enhanced operational efficiency.

What is claimed is:

1. A media library apparatus comprising:

a transportation mechanism for transporting a transportable storage medium;

a plurality of storage columns having a multiplicity of storage shelves for storing a multiplicity of storage media;

a plurality of drive devices each provided for reading or writing desired data on a selected one of the storage media;

a RAID controller for causing a plurality of the storage media that are to be subjected to a data striping process to be inserted in said plurality of drive devices and controlling operation of said plurality of drive devices, in a parallel fashion, so as to perform the data striping process on the storage media inserted in said drive devices; and a controller unit for imparting common addresses to the storage shelves of said plurality of storage columns in corresponding relation to respective predetermined physical locations of the storage shelves in such a manner that each group of the storage shelves of said storage columns lying at a same physical location within said media library apparatus is uniquely identifiable by a particular one of the common addresses, and causing the data striping process to be performed, by said RAID controller, on the storage media stored in the storage shelves of said storage columns to which is imparted a specific one of the common addresses.

2. A media library apparatus comprising:

a transportation mechanism for transporting a transportable storage medium;

a main storage section for storing a multiplicity of storage media;

a plurality of drive devices each provided for reading or writing desired data on a selected one of the storage media;

a RAID controller for causing a plurality of the storage media that are to be subjected to a data striping process to be inserted in said plurality of drive devices and controlling operation of said plurality of drive devices, in a parallel fashion, so as to perform the data striping process on the storage media inserted in said drive devices;

a spare storage medium storage section for storing a spare storage medium;

an abnormal medium storage section for storing a storage medium having an abnormal condition; and a controller unit for, when any one of the storage media that are being subjected to the data striping process has an abnormal condition, causing the storage medium having the abnormal condition to be moved over to said abnormal medium storage section to automatically replace the storage medium having the abnormal condition with the spare storage medium and carrying on the data striping process using the spare storage medium.

3. A media library apparatus comprising:

a transportation mechanism for transporting a transportable storage medium;

a plurality of storage columns having a multiplicity of storage shelves for storing a multiplicity of storage media;

a plurality of drive devices each provided for reading or writing desired data on a selected one of the storage media;

a RAID controller for causing a plurality of the storage media that are to be subjected to a data striping process to be inserted in said plurality of drive devices and controlling operation of said plurality of drive devices, in a parallel fashion, so as to perform the data striping process on the storage media inserted in said drive devices;

a spare medium storage section for storing a spare storage medium;

an abnormal medium storage section for storing a storage medium having an abnormal condition; and a controller unit for performing:
first control for imparting common addresses to the storage shelves of said plurality of storage columns in corresponding relation to respective predetermined physical locations of the storage shelves in such a manner that each group of the storage shelves of said storage columns lying at a same physical location within said media library apparatus is uniquely identifiable by a particular one of the common addresses, and causing the data striping process to be performed, by said RAID controller, on the storage media stored in the storage shelves of said storage columns to which is imparted a specific one of the common addresses; and second control for, when any one of the storage media that are being subjected to the data striping process has an abnormal condition, causing the storage medium having the abnormal condition to be moved over to said abnormal medium storage section to automatically replace the storage medium having the abnormal condition with the spare storage medium and carrying on the data striping process using the spare storage medium.

4. A media library apparatus comprising:

a transportation mechanism for transporting a transportable storage medium;

a main storage section for storing a multiplicity of storage media;

a plurality of drive devices each provided for reading or writing desired data on a selected one of the storage media;

a RAID controller for causing a plurality of the storage media that are to be subjected to a data striping process to be inserted in said plurality of drive devices and controlling operation of said plurality of drive devices, in a parallel fashion, so as to perform the data striping process on the storage media inserted in said drive devices;

a spare storage medium storage section for storing a spare storage medium;

a controller unit for, when any one of the storage media that are being subjected to the data striping process has an abnormal condition, causing the desired data to be written on the spare storage medium in place of the storage medium having the abnormal condition; and a medium introducing/discharging storage section removably attached to said media library apparatus;

wherein the storage medium having the abnormal condition is moved out of said main storage section to be stored in said medium introducing/discharging storage section so that the storage medium having the abnormal condition can be discharged out of said media library apparatus via said medium introducing/discharging storage section, and a spare storage medium is inserted into said medium introducing/discharging storage section in order to replenish said media library apparatus with the spare storage medium and is then moved out of said medium introducing/discharging storage section to be stored in said spare medium storage section.

5. A media library apparatus as recited in claim 2 which further comprises a medium introducing/discharging storage section removably attached to said media library apparatus, and wherein the storage medium having the abnormal condition is moved out of either said main storage section or said abnormal medium storage section to be stored in said medium introducing/discharging storage section so that the storage medium having the abnormal condition can be discharged out of said media library apparatus via said storage medium introducing/discharging storage section, and a spare medium is inserted into said medium introducing/discharging storage section in order to replenish said storage media library apparatus with the spare medium and is then moved out of said medium introducing/discharging storage section to be stored in said spare medium storage section.

6. A media library apparatus as recited in claim 3 which further comprises a medium introducing/discharging storage section removably attached to said media library apparatus, and wherein the storage medium having the abnormal condition is moved out of either said main storage section or said abnormal medium storage section to be stored in said medium introducing/discharging storage section so that the storage medium having the abnormal condition can be discharged out of said media library apparatus via said storage medium introducing/discharging storage section, and a spare medium is inserted into said medium introducing/discharging storage section in order to replenish said storage media library apparatus with the spare medium and is then moved out of said medium introducing/discharging storage section to be stored in said spare medium storage section.

7. A method of controlling a media library apparatus, said media library apparatus comprising: a transportation mechanism for transporting a transportable storage medium; a plurality of storage columns having a multiplicity of storage shelves for storing a multiplicity of storage media; a plurality of drive devices each provided for reading or writing desired data on a selected one of the storage media; and a RAID controller for causing a plurality of the storage media that are to be subjected to a data striping process to be inserted in said plurality of drive devices and controlling operation of said plurality of drive devices, in a parallel fashion, so as to perform the data striping process on the storage media inserted in said drive devices, said method comprising the steps of:

imparting common addresses to the storage shelves of said plurality of storage columns in corresponding relation to respective predetermined physical locations of the storage shelves in such a manner that each group of the storage shelves of said storage columns lying at a same physical location within said media library apparatus is uniquely identifiable by a particular one of the common addresses; and causing the data striping process to be performed, by said RAID controller, on the media stored in the storage shelves of said storage columns to which is imparted a specific one of the common addresses.

8. A method of controlling a media library apparatus, said media library apparatus comprising: a transportation mechanism for transporting a transportable storage medium; a main storage section for storing a multiplicity of storage media; a plurality of drive devices each provided for reading or writing desired data on a selected one of the storage media; a RAID controller for causing a plurality of the storage media that are to be subjected to a data striping process to be inserted in said plurality of drive devices and controlling operation of said plurality of drive devices, in a parallel fashion, so as to perform the data striping process on the storage media inserted in said drive devices; a spare storage medium storage section for storing a spare storage medium; and an abnormal medium storage section for storing a storage medium having an abnormal condition, said method comprising the steps of:

determining whether or not any one of the storage media that are being subjected to the data striping process has an abnormal condition; and when said step of determining determines that any one of the storage media that are being subjected to the data striping process has an abnormal condition, causing the storage medium having the abnormal condition to be moved from said main storage section over to said abnormal medium storage section; and taking out the spare storage medium from said spare medium storage section and carrying on the data striping process using the spare storage medium in place of the storage medium having the abnormal condition.

9. A method of controlling a media library apparatus, said media library apparatus comprising: a transportation mechanism for transporting a transportable storage medium; a plurality of storage columns having a multiplicity of storage shelves for storing a multiplicity of storage media; a plurality of drive devices each provided for reading or writing desired data on a selected one of the storage media; a RAID controller for causing a plurality of the storage media that are to be subjected to a data striping process to be inserted in said plurality of drive devices and controlling operation of said plurality of drive devices, in a parallel fashion, so as to perform the data striping process on the storage media inserted in said drive devices; a spare storage medium storage section for storing a spare storage medium; and an abnormal medium storage section for storing a storage medium having an abnormal condition, said method comprising the steps of:

imparting common addresses to the storage shelves of said plurality of storage columns in corresponding relation to respective predetermined physical locations of the storage shelves in such a manner that each group of the storage shelves of said storage columns lying at a same physical location within said media library apparatus is uniquely identifiable by a particular one of the common addresses;

causing the data striping process to be performed, by said RAID controller, on the storage media stored in the storage shelves of said storage columns to which is imparted a specific one of the common addresses;

determining whether or not any one of the storage media that are being subjected to the data striping process has an abnormal condition;

when said step of determining determines that any one of the storage media that are being subjected to the data striping process has an abnormal condition, causing the storage medium having the abnormal condition to be moved from said main storage section over to said abnormal medium storage section; and taking out the spare storage medium from said spare storage medium storage section and carrying on the data striping process using the spare storage medium in place of the storage medium having the abnormal condition.

* * * * *